Dec. 28, 1926.
F. E. WILLIFORD
ROLLER BEARING
Filed April 28, 1923
1,611,976
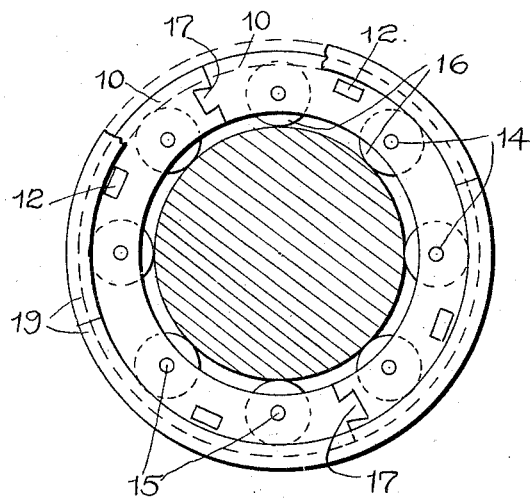
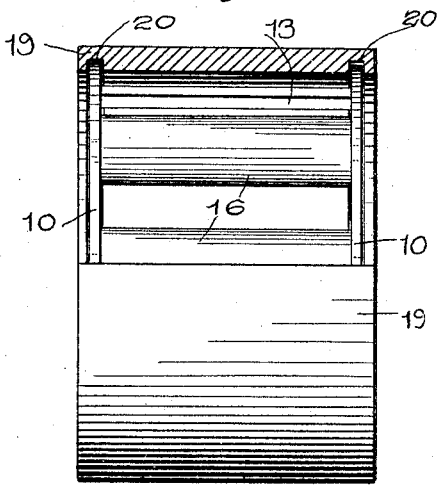
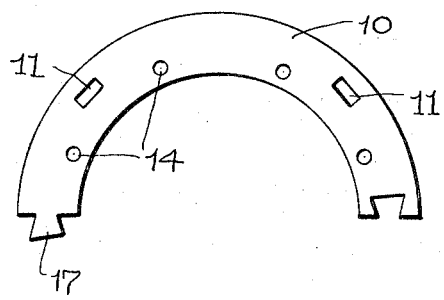
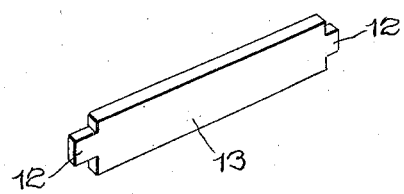
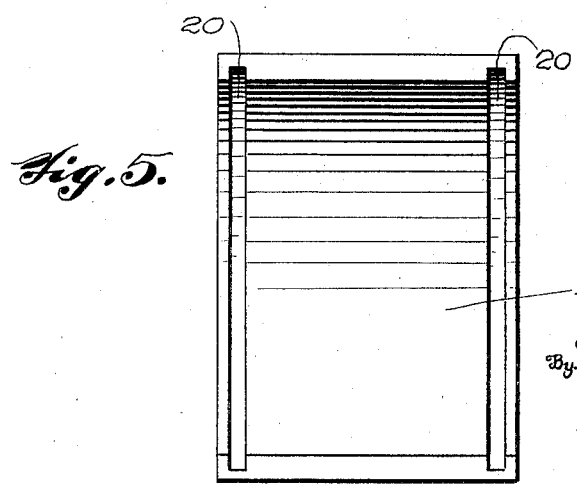
Inventor
Forrest E. Williford.
By
Titean N. Johnson
Attorney Patented Dec. 28, 1926.

1,611,976

UNITED STATES PATENT OFFICE.

FORREST E. WILLIFORD, OF BLACKSBURG, VIRGINIA.

ROLLER BEARING.

Application filed April 28, 1923. Serial No. 635,256.

This invention relates to roller bearings.

It is a well known fact that the usual type of roller bearing common around machinery, is only fitted, from a practical standpoint, for use in places where access can be had to the end of the journal or bearing on which or in which the roller bearing is located. In other words, the usual type of roller bearing is not at all fitted for use in such places where access can only be had from the side of the journal or bearing such as on the bearings of crank shafts and other like positions.

One important object of the present invention is to provide an improved and novel construction of bearing which is especially adapted for installation and use at an interior point of support or work of an irregular shaft or crank, as well as on an exterior point of work or support as in the case of a straight shaft or the like.

It is also a well understood fact that one of the reasons why roller bearings are not more practically used in such cases as on crank shafts is because wear on the connecting rod ends and the like cannot be readily compensated with the ordinary roller bearing.

A second important object of the invention is to provide an improved and novel construction of bearing especially adapted for use on what may be termed interior bearings, and which has as one of its elements, a sectional bearing bed or liner.

A third important object of the invention is to provide, in connection with a bearing having a sectional bed or liner, an arrangement wherein the bed or liner will coact to prevent longitudinal displacement of the parts of one with respect to each other, or with respect to the parts of the other.

A fourth important object of the invention is to provide an improved and novel construction of roller bearing having end rings and spacers, and a sectional bearing bed or liner so arranged that when installed the bearing bed or liner relieves the spacers from stresses tending to distort the end rings.

A fifth important object of the invention is to provide a novel and improved form of bearing having end rings which are made in arcuate sections, the rings being formed from a uniform thickness of material throughout, and being provided with interlocking means at the ends of the sections so arranged that the ring sections cannot be displaced relative to one another either radially or tangentially, but can only be separated and assembled by lateral movement.

A still further object of the invention is to provide an improved and novel form of bearing wherein all the parts of like character will be of uniform size, shape and construction, so that they may be readily interchanged, and so that the assembling of the device is greatly simplified, this arrangement further tending to economy in production both of the parts themselves and of the entire bearing.

With the above and other objects in view as will be hereinafter apparent the invention consists in general of certain novel details of construction and combinations of parts hereinafter fully described, illustrated in the accompanying drawings and specifically claimed.

In the accompanying drawings like characters of reference indicate like parts in the several views, and:

Fig. 1 is an end view of a roller bearing constructed in accordance with this invention.

Fig. 2 is a side view thereof partly in section.

Fig. 3 is a detail view showing one of the end ring sections separated from the remaining parts.

Fig. 4 is a detail view of one of the spacers removed from the remainder of the bearing.

Fig. 5 is an internal view of one of the bearing bed sections.

In the accompanying drawings, it will be seen that there is provided a pair of end or distance rings, each of which consists of a plurality of sections. In the present case, each of these sections has been shown as semi-circular, but it is to be understood that I may employ as many sections as I may find necessary, and that while two sections are found convenient for certain sizes of bearings, a greater number of sections may be found useful in other instances. Each of these sections is indicated at 10, and has at spaced intervals certain slots 11 to receive the reduced ends 12 of spacer bars 13. These slots and the spacer bars are preferably rectangular in form with their longer cross sectional dimension tangentially arranged with respect to the ring. Also each ring section has a series of bearing openings 14 to receive the journal ends 15 of bearing rollers 16. In addition to this, it will be noted that each section has at one end a dovetail extension 17, which fits a corresponding dovetail slot in the adjacent end of the next ring section. These rings are made preferably by stamping or punching from a sheet of metal, and in any event are of uniform thickness throughout, and it will be observed that the spacer bars 13 connect corresponding sections of each ring so that what may be termed the cage of the bearing is divided into a plurality of equal parts, which can be assembled with respect to each other by lateral movement in either direction.

It will also be noted that while I have shown the extension and slot at each section as dovetail, I may make these extensions and slots in any other preferred way, as it will be readily understood that any form which will be engageable by lateral sliding movement and which, when so engaged, will prevent separation of the engaged ends by tangential movement, or displacement by radial movement will fully answer the purpose.

I also provide, in connection with these two cage halves here shown, a bearing bed or liner, which fits within the bearing of the machine to which this roller bearing is applied. This bearing bed or liner is made in sections arcuate in form, and so arranged that the sections when assembled with their straight edges adjacent each other form a hollow cylinder. Each of these sections is indicated at 19, and each section has at each end an internal groove 20 wherein fits the outer peripheral portions of the respective ring sections, the fit being loose so that no great friction is developed at this part, and so that the bearing as a whole, may rotate freely within the liner. By reason of the provision of these grooves receiving the outer portions of the rings, stresses tending to distort these rings are borne by the solid liner parts rather than by the spacer bar so that such spacer bars are relieved from distorting stresses. Moreover, the grooves and end rings coact to prevent longitudinal movement of the bearing within the liner or bearing bed when the parts are all assembled.

There has thus been provided a simple and efficient device of the kind described and for the purpose specified.

It is obvious that minor changes may be made in the form and construction of the invention without departing from the material spirit thereof. It is not therefore desired to confine the invention to the exact form herein shown and described, but it is wished to include all such as properly come within the scope claimed.

Having thus described the invention, what is claimed as new, is:

1. In a roller bearing, a pair of end rings each formed of a plurality of arcuate sections, each section having an extension at one end in the plane of the section, said extension being wider at the portion remote from the body of the section than at the portion adjacent said body, the remaining end of each section being provided with a slot having a form corresponding to the extension and being adapted to receive the extension of a second section, spacer bars connecting corresponding sections of each ring, and a liner having grooves freely receiving the edge portions of said end rings.

2. In a roller bearing, a pair of end rings each formed of a plurality of arcuate sections, each section having a dovetail extension at one end and a corresponding dovetail slot at the other, each of said sections being formed from a single piece of sheet metal of uniform thickness throughout, spacer bars connecting corresponding sections of each ring, rollers having reduced ends journalled in said rings between the spacer bars, and a bearing bed or liner comprising a plurality of segmento-cylindrical plates arranged with their straight sides adjacent and having internal grooves adjacent their ends receiving the outer peripheral portions of said rings.

3. In a roller bearing, a pair of end rings each formed of a plurality of arcuate sections, each section having an extension at one end in the plane of the section, said extension being wider at the portion remote from the body of the section than at the portion adjacent said body, the remaining end of each section being provided with a slot having a form corresponding to the extension and being adapted to receive the extension of a second section, each of said sections being formed from a single piece of sheet metal of uniform thickness throughout, spacer bars connecting corresponding sections of each ring, rollers having reduced ends journalled in said rings between the spacer bars, and a bearing bed or liner comprising a plurality of segmento-cylindrical plates arranged with their straight sides adjacent and having internal grooves adjacent their ends receiving the outer peripheral portions of said rings.

4. In a roller bearing, a pair of end rings each formed of a plurality of arcuate sections, each section having a dovetail extension at one end and a corresponding dovetail slot at the other, each of said sections being formed from a single piece of sheet metal of uniform thickness throughout, spacer bars connecting corresponding sections of each ring, rollers having reduced ends journalled in said rings between the spacer bars, and a bearing bed or liner comprising a plurality of segmento-cylindrical plates arranged with their straight sides adjacent and having internal grooves adjacent their ends receiving the outer peripheral portions of said rings.

In testimony whereof I affix my signature.

FORREST E. WILLIFORD.